United States Patent [19]
Yamagami

[11] Patent Number: 6,038,365
[45] Date of Patent: Mar. 14, 2000

[54] IMAGE RETRIEVAL-ORIENTED PROCESSING APPARATUS WHICH GENERATES AND DISPLAYS SEARCH IMAGE DATA THAT IS USED AS INDEX

[75] Inventor: Taku Yamagami, Yokohama, Japan

[73] Assignee: Canon Kabushiki Kaisha, Tokyo, Japan

[21] Appl. No.: 08/901,131

[22] Filed: Jul. 28, 1997

Related U.S. Application Data

[63] Continuation of application No. 08/442,337, May 16, 1995, abandoned.

[30] Foreign Application Priority Data

May 20, 1994 [JP] Japan ................................. 6-106639

[51] Int. Cl.[7] .............................. H04N 5/91; H04N 7/00; H04N 5/93; H04N 5/225
[52] U.S. Cl. .............................. 386/46; 386/52; 386/117; 707/103; 707/102
[58] Field of Search .................................... 395/164, 159, 395/154, 145; 358/403; 345/123, 127, 129, 145, 146; 386/4, 15, 38, 117, 125, 109, 46, 52; 707/103, 101, 202, 204, 104

[56] References Cited

U.S. PATENT DOCUMENTS

| | | | |
|---|---|---|---|
| 4,982,291 | 1/1991 | Kurahashi et al. | 358/335 |
| 5,315,703 | 5/1994 | Methany et al. | 395/164 |
| 5,434,965 | 7/1995 | Matheny et al. | 395/159 |
| 5,524,193 | 6/1996 | Covington et al. | 395/154 |

OTHER PUBLICATIONS

Brochure from Nassau Landscaping & Maintenance, Inc. printed by Future Graphics in N.Y. 1993.
The Gmr Guide to Digital Imaging, 1993.
Getting Started With Image Wizard, ImageWare Software, Inc. version 1.0, 1992.

*Primary Examiner*—Douglas W. Olms
*Assistant Examiner*—David R Vincent
*Attorney, Agent, or Firm*—Fitzpatrick, Cella, Harper & Scinto

[57] ABSTRACT

An image processing apparatus according to the present invention includes a designating unit for designating an image area to be used as a retrieval image from a recorded image recorded in a recording medium, a storing unit for storing image area data representing the image area designated by the designating unit in connection with the corresponding recorded image, and a displaying unit for displaying, as the retrieval image, an image of the image area on the basis of the corresponding image area data stored in the storing unit. Further, an image processing apparatus according to the present invention includes a designating unit for designating an image area from an original image constituting a screen as a retrieval image, a storing unit for storing the retrieval image designated by the designating unit in connection with the corresponding original image, a displaying unit for displaying the retrieval image designated by the designating unit, an instructing unit for instructing the retrieval image displayed by the displaying unit, and a display control unit for displaying, on the displaying unit, the original image corresponding to the retrieval image instructed by the instructing unit.

13 Claims, 10 Drawing Sheets

FIG. 1

BACKGROUND OF THE INVENTION

1. Field of the Invention

This invention relates to a video camera and more particularly to a video camera which is arranged to permit confirnation of an object through a viewfinder.

2. Description of the Related Art

Photographers compose pictures to be taken by looking at the objects through viewfinders. However, unlike an optical camera or an electronic still camera, shooting with a video camera repeatedly alternates between a recording mode and a pause mode.

However, a person who is unaccustomed to shooting sometimes happens to unconsciously shoot the ground or some meaningless object without knowing that the camera actually remains in the recording mode while the camera is considered to be in the pause mode and thus wastes a tape, and electric energy as well, with the picture of an unwanted scene.

In other words, it has been a shortcoming of the conventional video camera that the tape and the electric energy tend to be wasted by a lengthy unintended shooting at the ground or some other meaningless scene.

SUMMARY OF THE INVENTION

Such being the background situation, it is an object of this invention to provide a video camera which is arranged to minimize unnecessary power consumption Under this object, a video camera which is arranged as an embodiment of this invention comprises image sensing means for converting an object image into a video signal; a viewfinder for visually showing the object image; detecting means for detecting a physical access of the body to the viewfinder; a power source; and control means for controlling the supply of electric power from the power source to the viewfinder according to an output of the detecting means.

It is another object of the invention to provide a video camera having a recorder which is arranged to generate no record of meaningless shooting.

Under that object, a video camera which is arranged as another embodiment of the invention comprises image sensing means for converting an object image into a video signal; a viewfinder for visually showing the object image; detecting means for detecting a physical access of the body to the viewfinder; a power source; recording means for recording the video signal on a recording medium; and control means for controlling the supply of electric power from the power source to the recording means according to an output of the detecting means.

These and further objects and features of the invention will become apparent from the following detailed description thereof taken in connection with the accompanying drawings.

IMAGE RETRIEVAL-ORIENTED PROCESSING APPARATUS WHICH GENERATES AND DISPLAYS SEARCH IMAGE DATA THAT IS USED AS INDEX

This application is a continuation of Application No. 08/442,337 filed May 16, 1995, now abandoned.

BACKGROUND OF THE INVENTION

1. Field of the Invention

The present invention relates to an image processing apparatus, and more particularly, to an image processing apparatus intended to achieve an improvement in the efficiency of image retrieval.

2. Description of the Related Art

In recent years, digital electronic still cameras designed to record photographed images on a digital recording medium, such as a semiconductor memory card or a small hard disk (an optical disk), in the form of digital signals have been developed and are available on the market. Such digital recording media have a structure which allows the data recorded thereon to be read out with a personal computer.

Since image data can generally be recognized only when a human being looks at them, when image data are reproduced, a list of a plurality of reduced images may generally be displayed so that the user can check the contents of image files, using the reduced images themselves as the retrieval images.

However, in retrieval display of reduced images, since an entire image is simply reduced to, for example, one eighth in both its longitudinal and lateral dimensions, the reduced image may be too small to be recognized easily, making the use of that reduced image as a retrieval image impossible. In the case of, for example, an image photographed from a document, character data may be reduced to a size which makes decoding of the data almost impossible. Thus, in the case of a document shown in FIG. 1 in which desirable retrieval data to be offered to the user are, for example, titles in the document (such as "SUMMARY OF THE INVENTION" in the case shown in FIG. 1), if an entire image is reduced, most of the characters become too small to be decoded, making achievement of the original purpose, retrieval image display, impossible.

SUMMARY OF THE INVENTION

In view of the aforementioned problems, an object of the present invention is to provide an image processing apparatus which enables images suited for retrieval image display to be offered to the user and which enables image retrieval to be conducted fast and reliably.

To achieve the above object, there is disclosed in one aspect of the present invention an image processing apparatus which comprises designation means for designating an image area to be used as a retrieval image from a recorded image recorded in a recording medium, storage means for storing image area data representing the image area designated by said designation means in connection with the corresponding recorded image, and display means for displaying, as the retrieval image, an image of the image area on the basis of the corresponding image area data stored in said storage means.

There is disclosed in another aspect of the present invention an image processing apparatus which comprises designation means for designating an image area from an original image constituting a screen as a retrieval image, storage means for storing the retrieval image designated by said designation means in connection with the corresponding original image, display means for displaying the retrieval image designated by said designation means, instruction means for instructing the retrieval image displayed by said display means, and display control means for displaying, on said display means, the original image corresponding to the retrieval image instructed by said instruction means.

Other objects, features and advantages of the invention will become apparent from the following detailed description taken in conjunction with the accompanying drawings.

BRIEF DESCRIPTION OF THE DRAWINGS

FIG. 1 illustrates a photographed image;

DETAILED DESCRIPTION OF THE PREFERRED EMBODIMENTS

An embodiment of the present invention will now be described with reference to the accompanying drawings.

Figure 2:
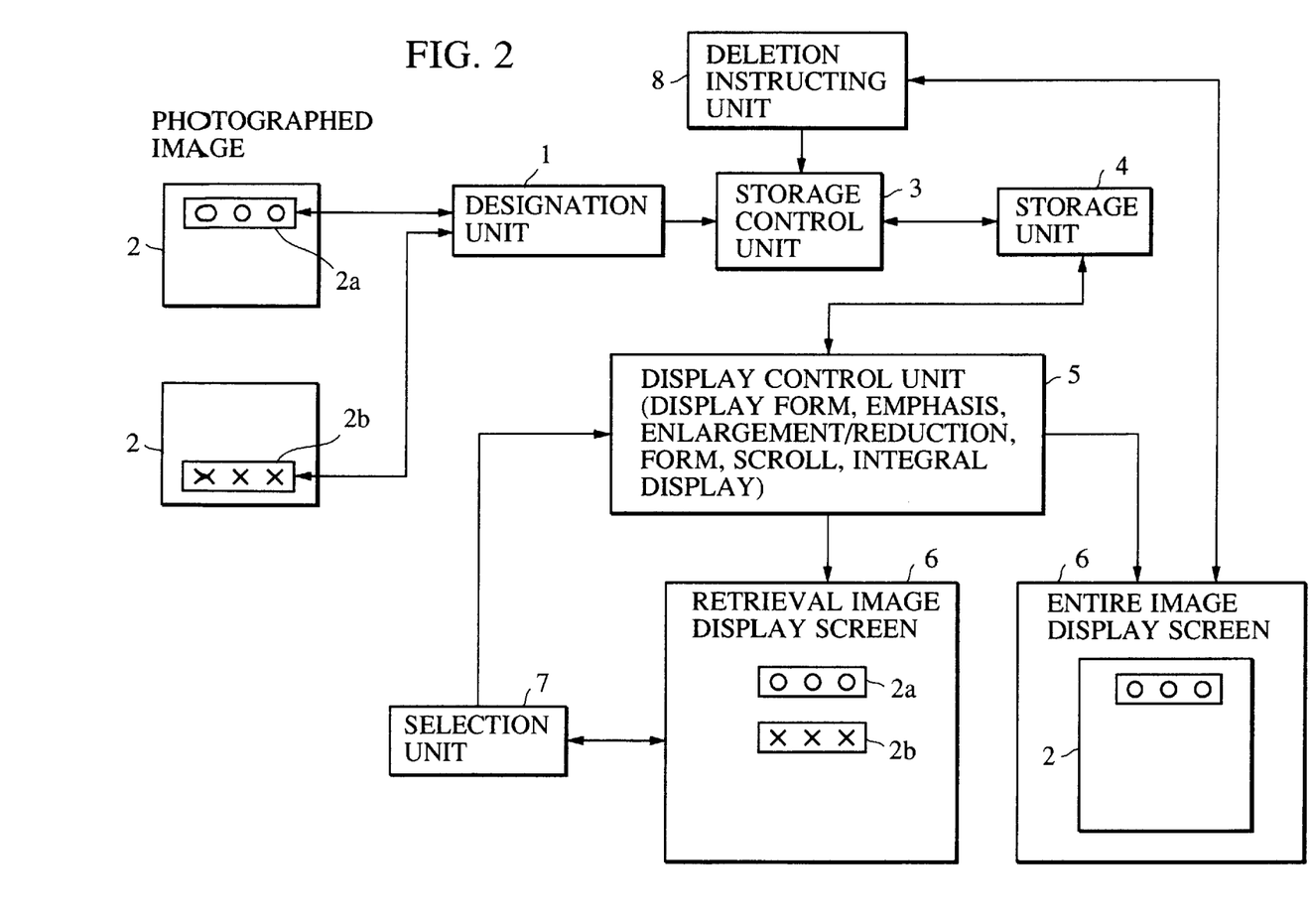
FIG. 2 illustrates the main features of an embodiment according to the present invention.

FIG. 2 illustrates elemental features of the present invention.

A designating unit 1 is constituted by a pointing device, such as a mouse. The user designates image areas 2a and 2b in recorded images 2 as retrieval images.

A storage control unit 3 stores image area data representing the image areas 2a and 2b designated with the designating unit 1 in a storage unit 4 constituted by, for example, a memory card or a hard disk.

At that time, in a case where the recorded images 2 are present in the storage unit 4, the image area data are added to the image files of the respective recorded images 2 when stored in the storage unit 4. In a case where the recorded images 2 are present in a storage medium other than the recording unit 4, the image area data are stored in the storage unit 4 in connection with the respective recorded images by means of, for example, an address.

When the recorded images 2 are reproduced, a display control unit 5 displays, on a screen 6, images of the image areas 2a and 2b in the recorded images 2, corresponding to the image area data stored in the storage unit 4, as retrieval images on the basis of those image area data. The display control unit 5 has the function of controlling a display form, emphasis display, enlargement/reduction, form designation, integral display or scrolling, which will be described later, when it displays retrieval images on the screen 6.

When the user performs selection of the retrieval images by operating an operation unit 7 constituted by a pointing device, such as a mouse, while looking at the screen 6 which is displaying the retrieval images, the display control unit 5 displays, on the screen 6, the recorded image 2 corresponding to the selected retrieval image. Thus, the user can reliably and readily obtains a desired recorded image.

When the image area used as a retrieval image is, for example, altered, the user deletes the corresponding image area data from the storage unit 4 by operating a delete instructing unit 8.

The storage control unit 3 and the display control unit 5 are constituted by a microcomputer composed of a CPU 107, a ROM 110 and a RAM 111, which will be described later.

Figure 3:
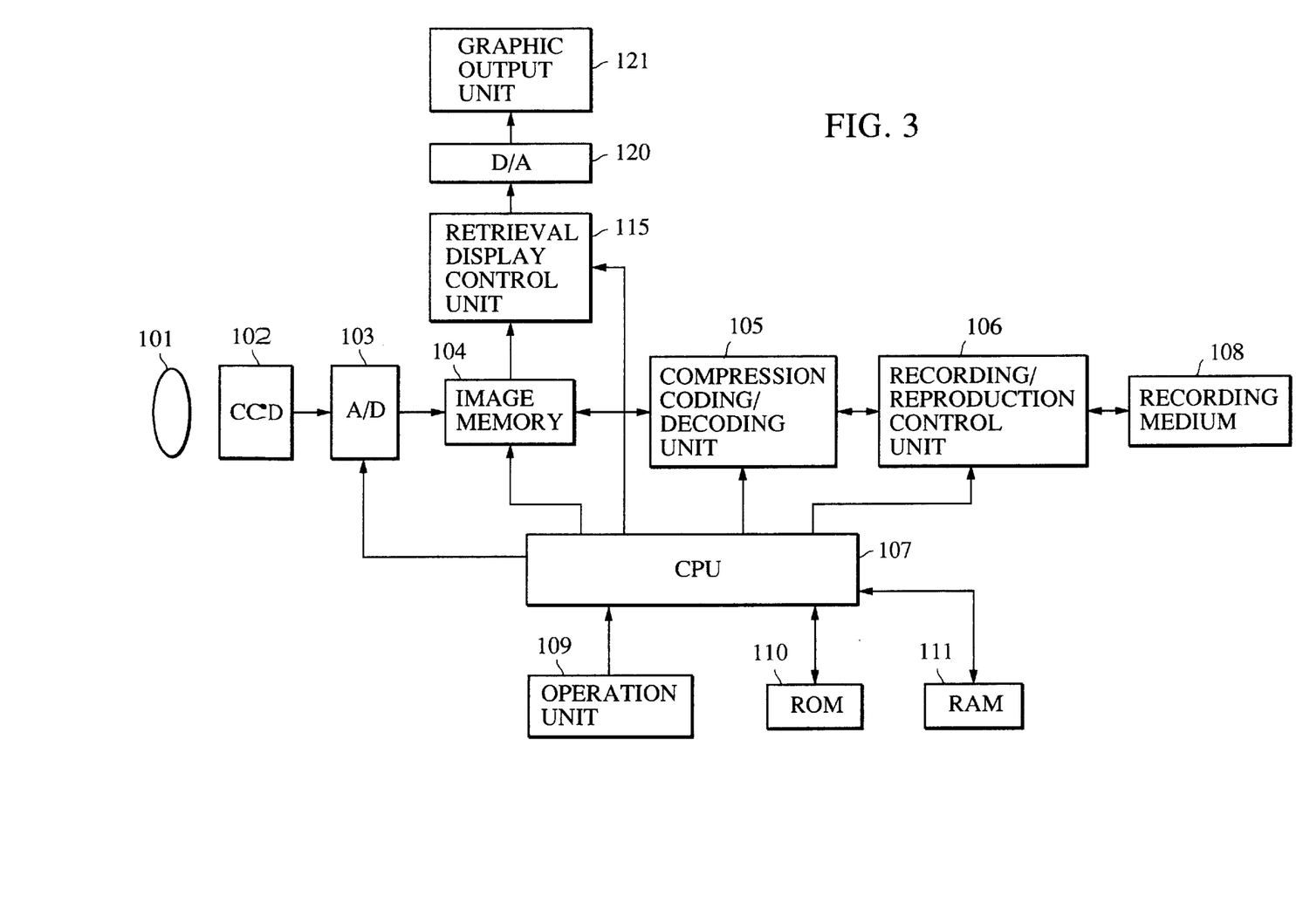
FIG. 3 is a block diagram of an electronic still camera having an image retrieval function according to the foregoing embodiment of the present invention.

FIG. 3 is a block diagram of an electronic still camera having the image retrieval function according to the above embodiment of the present invention.

In FIG. 3, an optical image of an object, input through a lens 101, is converted into a video signal by an image device 102 which may be a charge-coupled device ("CCD").

The imaging device 102 performs storage of electric charges corresponding to the optical image of an object and reading of a video signal, in response to a control signal given by the CPU 107. The video signal read from the imaging device 102 is converted into a digital signal by an A/D converter 103.

Between the imaging device 102 and the A/D converter 103 are provided respective means (not shown) for adjusting the video signal, including gamma correction means, color signal formation means and white balancing means. In FIG. 3, the illustration of a stop or shutter of the video camera is omitted, because such portion is not connected directly to the present invention.

The video signal converted into a digital signal by the A/D converter 103 is stored in an image memory 104.

A compression coding/decoding unit 105 reads out image data from the image memory 104 and compresses the read image data.

The compressed image data is written in a recording medium 108 through a recording/reproduction control unit 106. The employed compression method may be the Joint Photographic Experts Group (JPEG) method which conforms to the international standards.

The recording/reproduction control unit 106 adopts, as an interface for recording media, an interface conforming to the Japanese Electronic Industry Development Association (JEIDA) standard.

That is, the recording/reproduction control unit 106 is made up of a logic circuit and an interface connector which write the data output from the compression coding/decoding unit 105 in the recording medium in compliance with an interface protocol or read out the data from the recording medium.

The recording medium 108 may be a suitable memory card or hard disk (such as an optical disk). Data is recorded on the recording medium in compliance with the JEIDA DOS file system.

The CPU 107 executes the process shown in FIG. 7, which will be described later, on the basis of the program stored in a ROM 110, and performs control of the respective units constituting the electronic still camera.

A RAM 111 temporarily stores data during execution of various processes by the CPU 107 as well as processed data.

When an image is reproduced, the image data recorded on the recording medium 108 is supplied through the recording/reproduction control unit 106 to and decoded by the compression coding/decoding unit 105. The decoded image data is stored in the image memory 104 again. The image data stored in the image memory 104 is input, through a retrieval display control unit 115, to and converted into an analog video signal by a D/A converter 120. The obtained analog video signal is output to an image output unit 121 so as to allow the user to confirm the photographed image. The video output unit 121 is implemented by a display device, such as an electric view finder or a liquid crystal display panel.

The image memory 104 is constructed in such a manner that it can be accessed by the CPU 107 in units of pixels. Thus, the user can select partial images of the images stored in the image memory 104 by operating an operation member constituting an operation unit 109 which may be a track ball or a mouse, or a touch panel (a pressure-sensitive digital panel) provided on the LCD panel. That is, the CPU 107 displays a figure, such as a square, on the image stored in the image memory 104 by following the movement of the track ball or a pen on the touch panel so as to allow the user to select a partial image.

Figure 6:
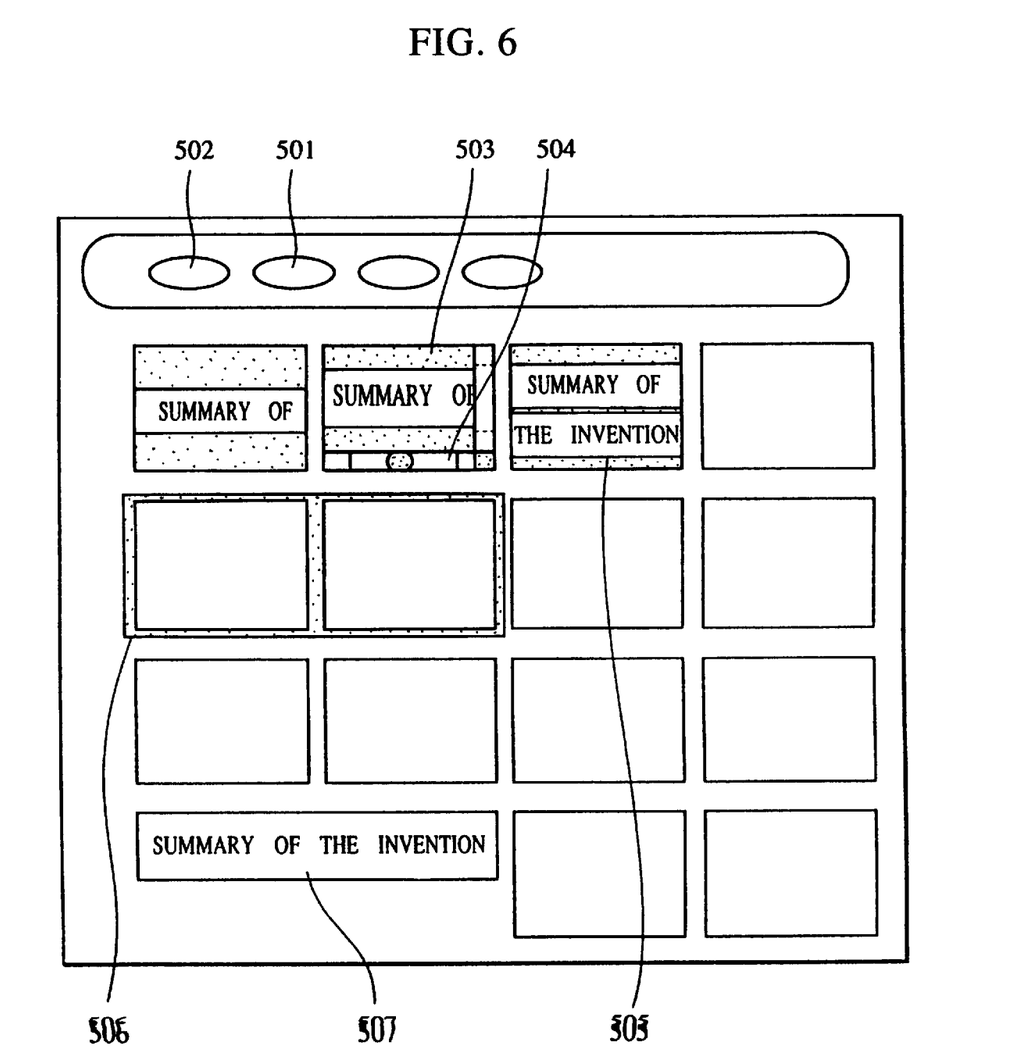
FIG. 6 illustrates a display example employed in the image retrieval according to the foregoing embodiment of the present invention.

For retrieval operation, the retrieval display control unit 115 creates a retrieval screen on the basis of the images read from the image memory 104 under the control of the CPU 107 (see FIG. 6).

Figure 4:
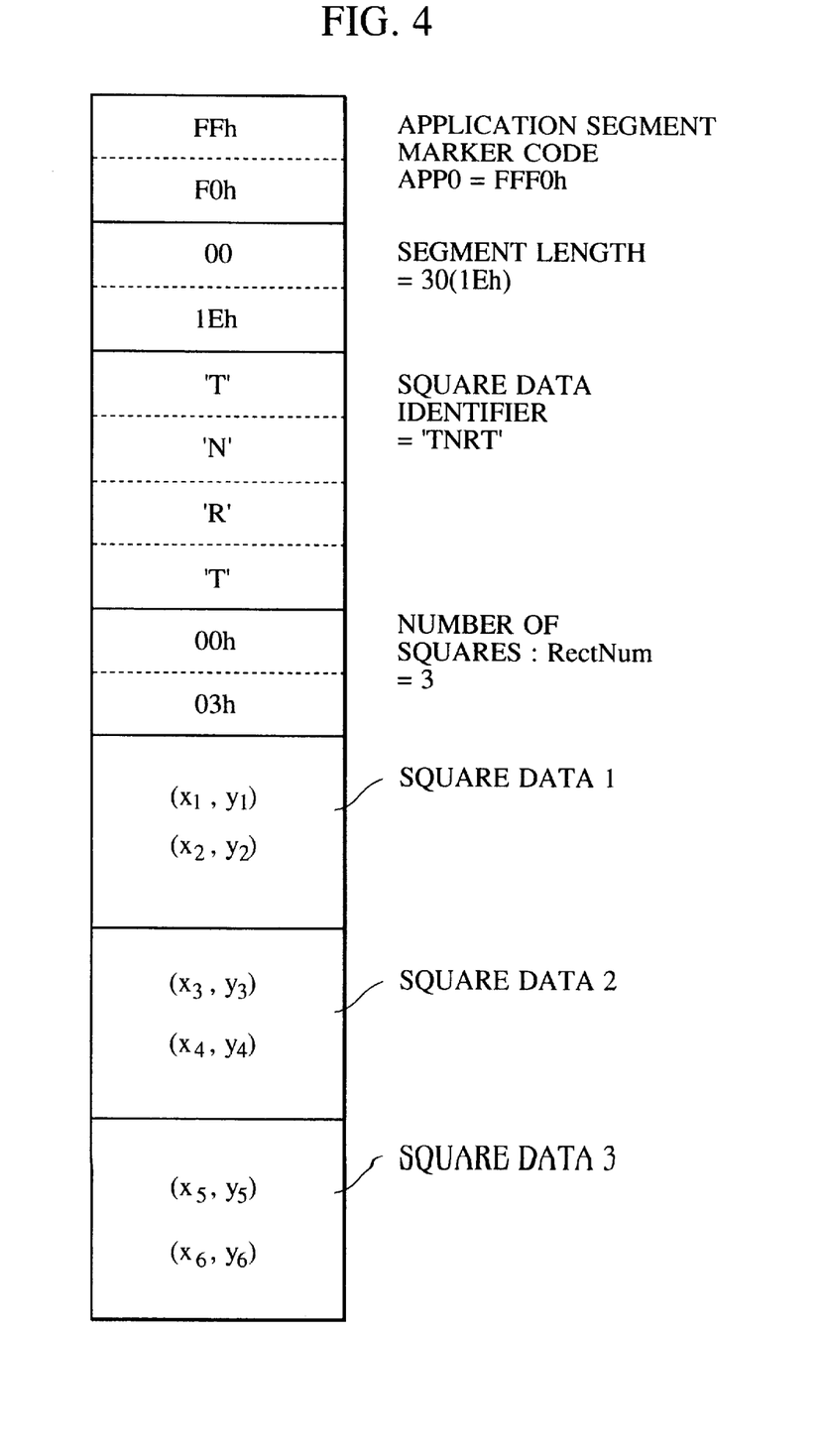
FIG. 4 illustrates a data format which is part of an image file according to the JPEG method.

Retrieval square data, which is the image area data that the user registers, is stored in, for example, an adequate header portion of an image file. In the case of, for example, the JPEG data format, there is a field where data characteristic to application are stored. In a practical operation, 2 bytes representing a segment length (a segment length from which the marker code and the length of the segment length itself are excluded) and an ASCII character string, e.g., the 4 characters "TNRT", representing storage of retrieval square data, follow an application segment marker code APPO, as shown in FIG. 4. Subsequently, a variable RectNum, representing the number of registered squares, is inserted. To store such data, a field of, for example, 2 bytes is enough. Thereafter, a corresponding number of square data items are inserted. To express a single square data item, four coordinate values on a two-dimensional coordinate system for both an upper left position and a lower right position of that square data are stored.

If the size of image data is represented by 2 bytes×2 bytes, a field of (2×4) bytes is necessary.

When RectNum=3, the segment length of APPO is calculated as follows:

"TNRT" 4 bytes+RectNum 2 bytes+square data 24 bytes= 30 bytes

For reduced retrieval image display, partial images corresponding to such square data in original images are removed and then reduced before being displayed in the video output unit 121.

The operation unit 109 may be made up of an operation member for pointing, a switch button for driving a releasing operation and so on (which may be a mouse).

The CPU 107 is programmed such that it displays a retrieval screen shown in FIG. 6 on the image memory 104, and operates according to clicking of a pointing device on the panel (in this embodiment, a mouse is used for selection of retrieval images).

It is thus possible to compose a user interface for edition of selection data on image data, e.g., register, display and deletion of square data used to retrieve the images which have been area-designated by the user.

It is assumed that at least a deletion button 501 and a retrieval image display button 502, shown in FIG. 6, are provided as control buttons.

The process executed by the CPU 107 when retrieval with retrieval images is conducted and retrieval images are edited using a pointing device and the control buttons shown in FIG. 6 will be described below with reference to the flowchart of FIG. 5.

When the reproduction mode is entered, the camera enters the retrieval image display mode in step S201, and displays, as retrieval images, a list of reduced images of entire images or of partial images of the images recorded on the recording medium 108.

At that time, if there are a plurality of retrieval square images registered in an image of a screen, corresponding reduced images may be displayed. In that case, to indicate that a plurality of reduced images belong to a single image, an integral display 506 may be affixed, as shown in FIG. 6.

Further, the retrieval square image designated by the user and having undefined size and form may be enlarged or reduced and displayed in a frame having almost the same size as that in which the reduced image of an entire photographed image is displayed as the retrieval image.

Further, a scroll bar 504, such as that shown in a retrieval display 503 shown in FIG. 6, may be provided so that the user can scroll the image to see the contents of an elongated image.

The above-described display methods may be combined. That is, if the length and width of a square are close to each other, it may be enlarged or reduced and displayed in a frame having the same size as that in which the reduced image of an entire image is displayed as the retrieval image. If not, a scroll bar 504 may be provided in both or either of the longitudinal and lateral directions of a retrieval image, and the retrieval image may be enlarged or reduced and displayed at the same time.

Further, in the case of an elongated square, a retrieval image may be displayed over a plurality of lines, like a retrieval display 505 shown in FIG. 6. Alternatively, a retrieval image may be displayed in a square having a designated contour, like a retrieval display 507.

Further, if a partial image designated by the user is displayed as a retrieval image, it may be displayed in a display format, e.g., a frame color or a frame width, which is is different from those in which the reduced image of a photographed entire image is displayed as a retrieval image.

Figure 5:
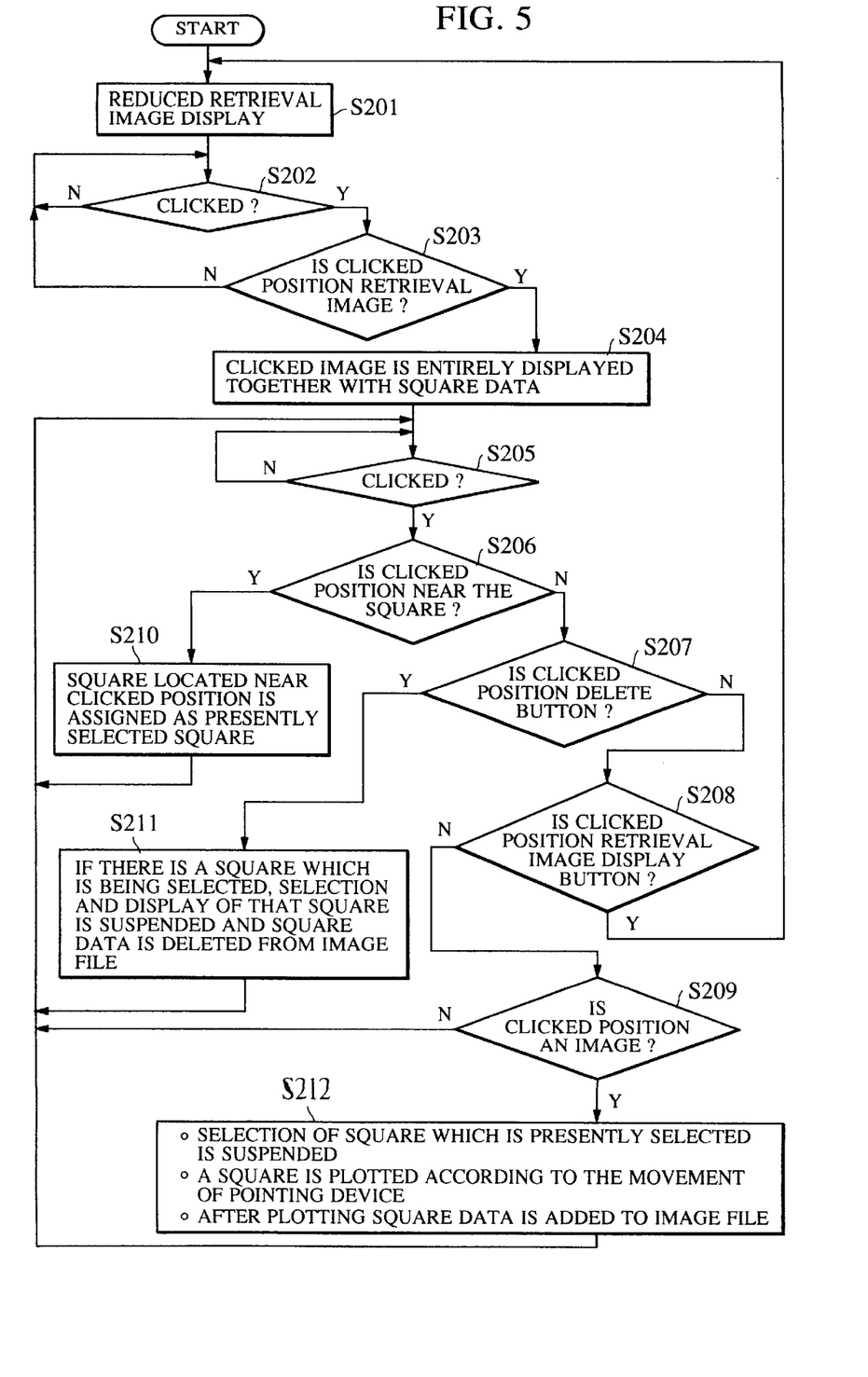
FIG. 5 is a flowchart showing an image retrieval and editing process of the foregoing embodiment according to the present invention.

Turning back to the flow chart of FIG. 5, if the user clicks a certain reduced retrieval image with a mouse pointer, the camera will display an original image of that reduced retrieval image in an enlarged fashion in steps S202 to S204. At that time, if the square data which has been already registered by the flowchart is in the image file of that original image, the contour of the registered square is displayed in such a manner that it is overlapped on the original image.

Figure 7:
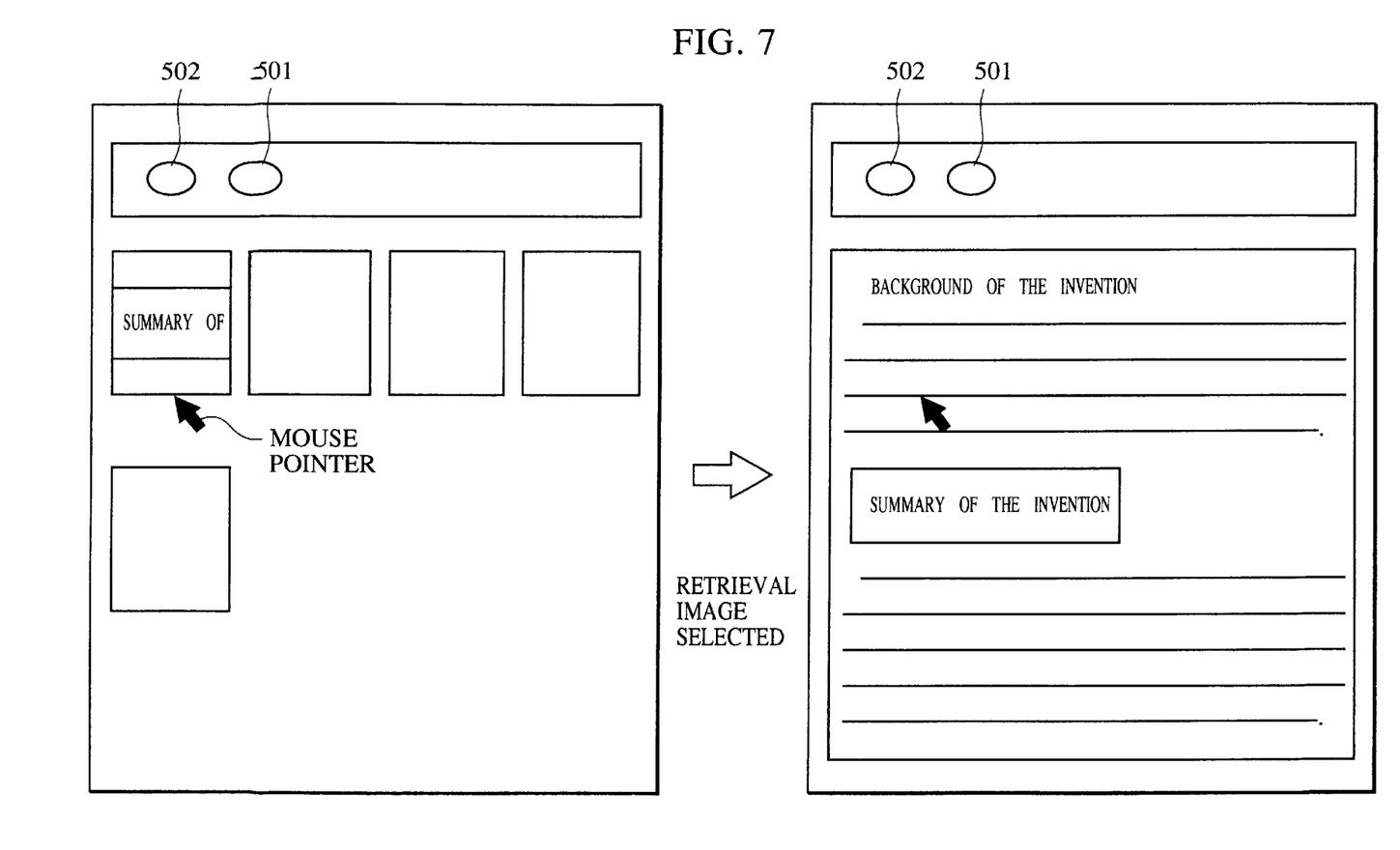
FIG. 7 illustrates a display example for the image retrieval process according to the foregoing embodiment of the present invention.

More specifically, in the case shown in FIG. 7, a square which surrounds "SUMMARY OF THE INVENTION" is displayed together with the original image so that the portion to which attention should be paid can be emphasized in the displayed image.

Figure 8:
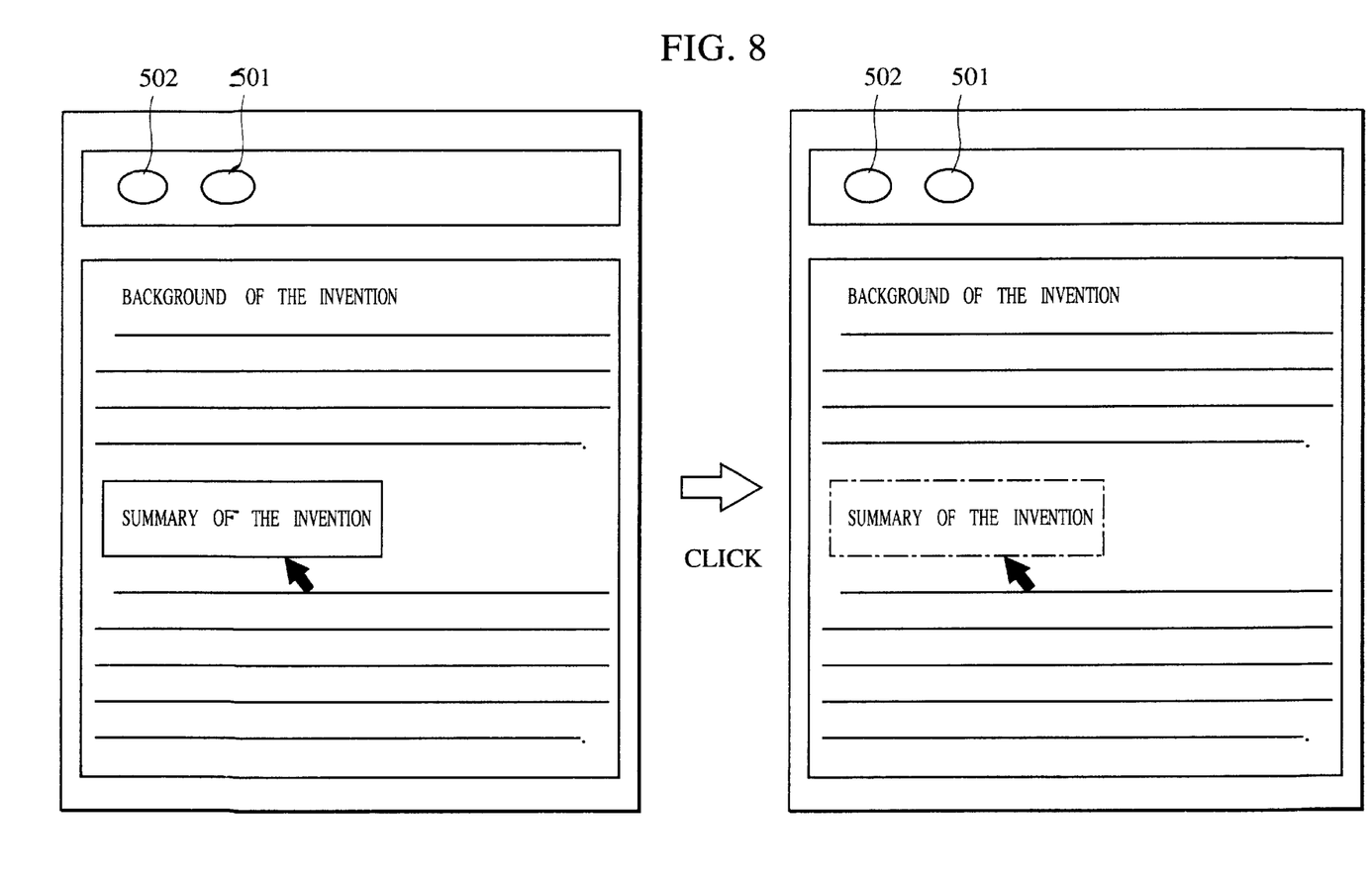
FIG. 8 illustrates a display example for the image retrieval process according to the foregoing embodiment of the present invention.

Next, in step S205, the user's clicking of a pointing device is awaited. If it is detected that the clicked position is the vicinity of the already registered square in step S206, the process goes to step S210, that is, the square located in the vicinity of the clicked position is assigned as a presently selected square and that square is displayed in a different way from the normal display to show that that square has been selected. Normal display is conducted using a solid line and selection display is performed using a broken line (see FIG. 8).

Figure 9:
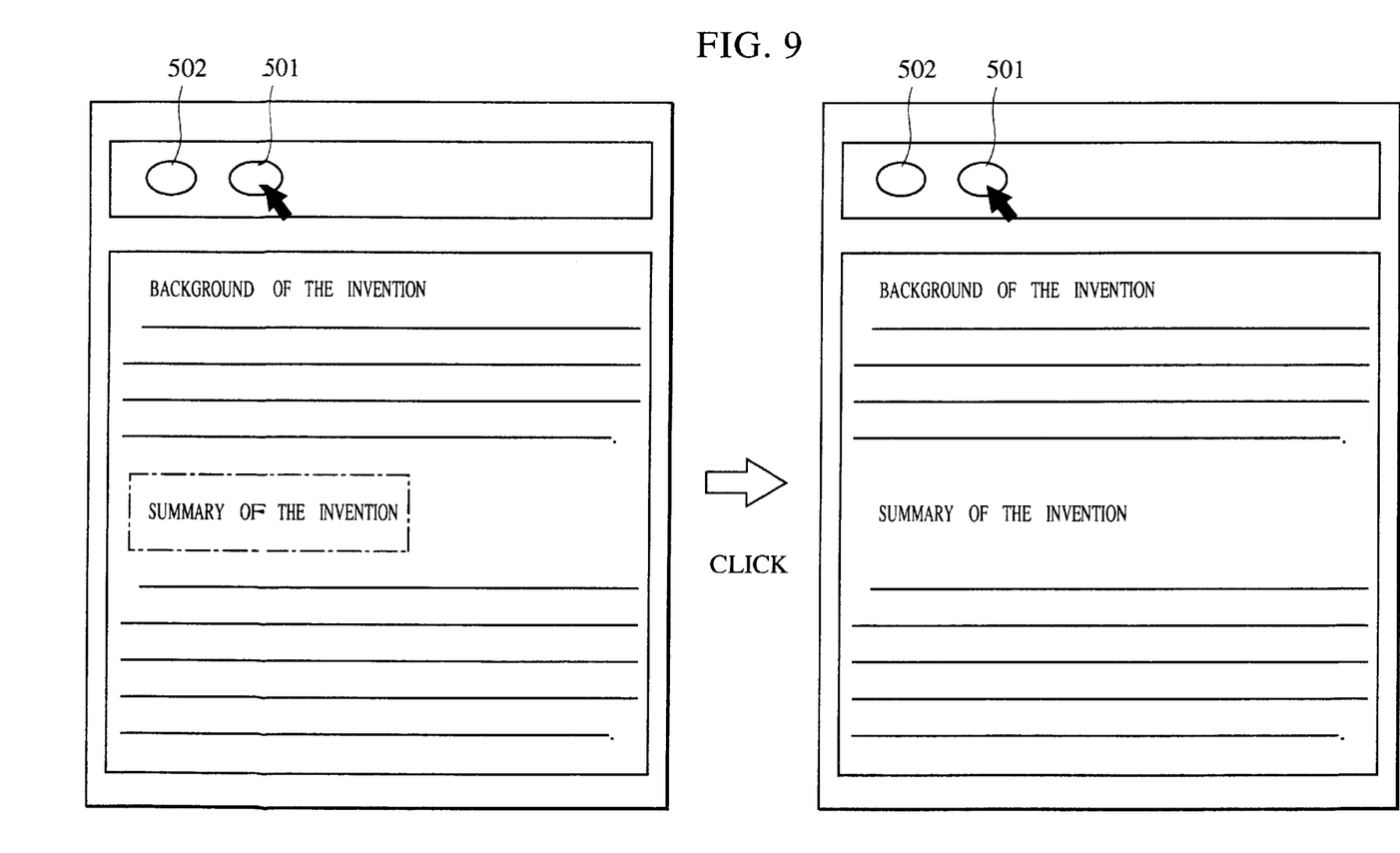
FIG. 9 illustrates a display example for the image retrieval process according to the foregoing embodiment of the present invention.

If it is detected that the clicked position is the delete button 501 in step S207, the process goes to step S211, that is, if there is the presently selected square, that selection is suspended. That is, broken line display is suspended and display is returned to normal display. Also, that square data is deleted from the image file, and display of the square is erased (see FIG. 9).

If it is detected that the clicked position is the retrieval image display button 502 in step S208, the process returns to the reduced retrieval image display process of step S201. If it is detected that the clicked position is another portion of the image in step S209, the process goes to step S212.

In step S212, if there is the presently selected square, selection of that square is suspended. That is, broken line display is suspended, and normal display is returned. Next, a square is plotted according to the movement of the pointing device operated by the user. For example, a square is drawn starting from a point clicked by the user first in an oblique direction indicated by the point to which the user has moved the pointing device. If the square is changed as a result of the operation of the user, the previously plotted square is erased so that only a single square is presented to the user. This process continues until the user lets go of the pointing device. When the user's plotting of a square is completed, the CPU 107 writes the square data finally plotted by the user in the image file of an original image.

As will be understood from the foregoing description, since the present embodiment is constructed such that only a partial image the user desires to use as a retrieval image can be displayed as a retrieval image, even in a reduced display, it is possible to obtain an excellent retrieval screen which can offer to the user all the data required for retrieval.

Various modifications and changes may be made in the present invention without departing from the spirit and scope thereof.

While the foregoing embodiment of the invention is substantially structured such that only square data is added to the image file of an original image, other embodiments of an image processing apparatus might include an image processing apparatus in which a reduced image is created and added to the image file of a corresponding photographed image when square data is registered or in which only a reduced image is added to the image file of a photographed image.

In such a case, since it is not necessary for a reduced image, serving as a retrieval image, to be created at a subsequent reduced retrieval image display, retrieval image display can be processed at a high speed.

In place of the square data, the image data of a partial image, to be served as a retrieval image, may be added to the image file of a corresponding original image as image area data, according to the present invention.

While the preferred embodiment is substantially shown in which square data is produced by a camera and in which a retrieval image is displayed on the basis of the square data for reproduction of a photographed image, other embodiments of an image processing apparatus would include an image processing apparatus in which a computer, such as a personal computer, is used to perform a similar process.

The present invention can also be applied to a system which has no image input circuit of a camera and in which images are retrieved from a recording medium on which images have already been recorded. Such a structure may be constructed in the manner shown in, for example, FIG. 10.

Figure 10:
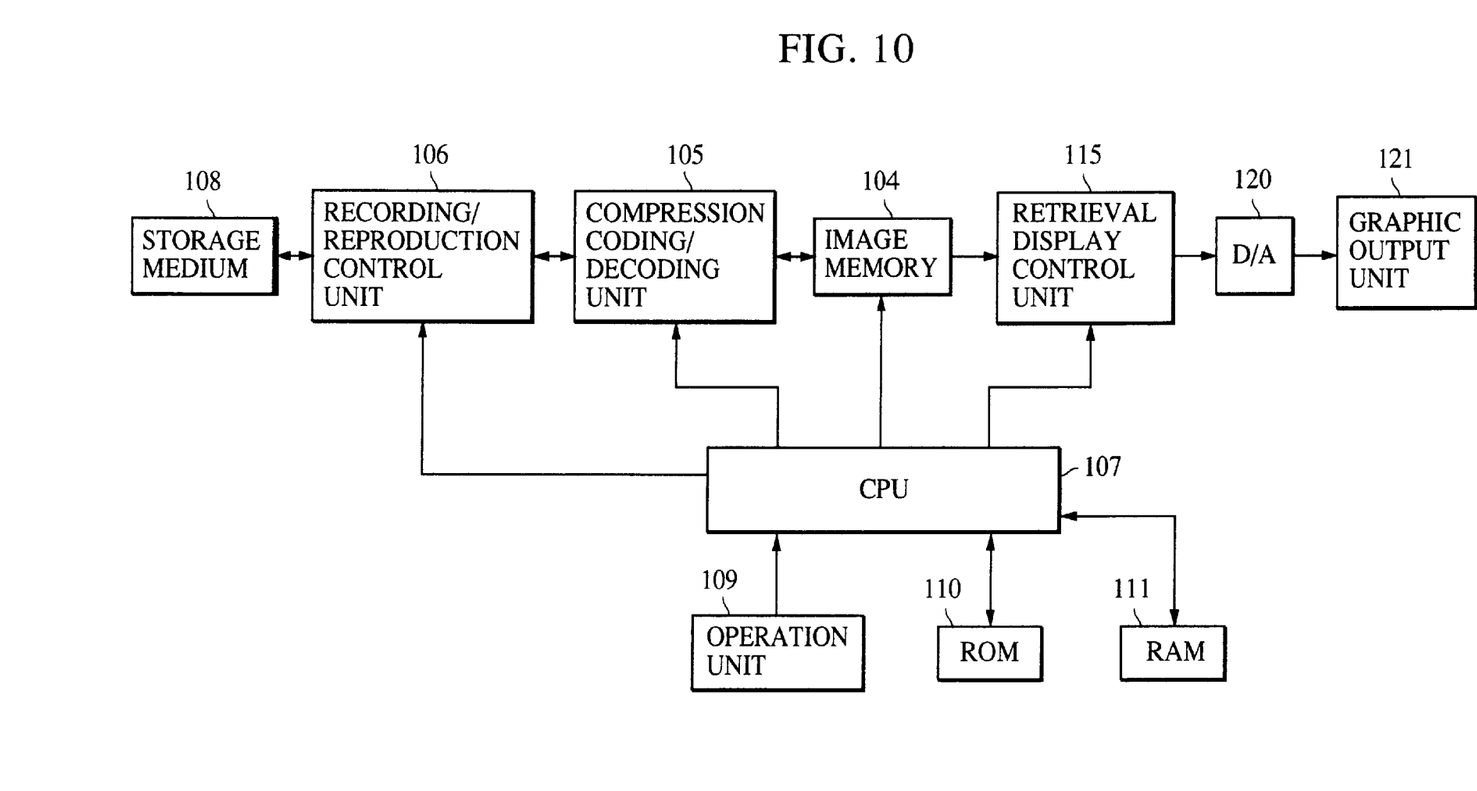
FIG. 10 is a block diagram of an image processing apparatus for image retrieval according to another embodiment of the present invention.

Reference numerals in FIG. 10 identical to those in FIG. 3 represent similar or identical elements.

Further, although retrieval of still images has been described in the present invention, the present invention can also be applied to retrieval of series of moving images. In that case, retrieval images are designated from among series of moving pictures in the manner described in connection with the above-described embodiment, and those retrieval images are recorded in connection with the associated moving pictures. For retrieval, a retrieval screen is displayed in a similar manner to that of the above embodiment to display retrieval images. When the user designates a desired retrieval image with a pointing device, a moving image may be reproduced from a screen which contains that retrieval image.

In other words, the foregoing description of the preferred embodiments has been given for illustrative purposes only and is not to be construed as imposing any limitation in any respect.

The scope of the invention is, therefore, to be determined solely by the following claims and is not to be limited by the text of the specifications, and alterations made within a scope equivalent to the scope of the claims fall within the true spirit and scope of the invention.

What is claimed is:

1. An image processing apparatus, comprising:
   a) generation means for generating search image data, from original image data recorded on a recording medium, as an index for searching for and retrieving the original image data, wherein the search image data is image data of a desired area extracted from the original image data for one picture, and wherein said generation means selectively designates desired areas of various sizes; and
   b) display means for displaying the search image data, wherein said display means displays a plurality of different search images on a display.

2. The apparatus according to claim 1, further comprising input means for inputting the original image data and recording means for recording the original image data on the recording medium.

3. The apparatus according to claim 2, wherein said recording means records area data indicating the position in which the desired area exists on the recording medium.

4. The apparatus according to claim 3, further comprising display control means for controlling said display means such that the search image is extracted from the original image data in accordance with the area data, and the extracted search image data is displayed on said display means.

5. The apparatus according to claim 1, further comprising:
   designation means for designating the search image data displayed by said display means; and
   display control means for controlling said display means to display the original image data corresponding to the search image data designated by said designation means.

6. The apparatus according to claim 5, wherein said display control means instructs said display means to emphasize the search image data in the original image data when said display control means instructs said display means to display the original image data.

7. The apparatus according to claim 1, further comprising means for changing the contour of the displayed search image.

8. The apparatus according to claim 1, wherein said input means includes image pick-up means for imaging an object image to supply the original image data.

9. The apparatus according to claim 1, wherein the original image data is compression-encoded and the compression-encoded original image data is recorded on the recording medium.

10. The apparatus according to claim 1, wherein said generation means is able to generate said plurality of different search image data from the original image data for one picture.

11. The apparatus according to claim 1, wherein said display means is able to scroll each of the search images.

12. An image processing method, comprising the steps of:
   a) generating search image data, from original image data recorded on a recording medium, as an index for searching for and retrieving the original image data, wherein the search image data is image data of a desired area extracted from the original image data for one picture, and wherein said generating step includes selectively designating desired areas of various sizes; and
   b) displaying the search image data, wherein said displaying step displays a plurality of different search images on a display.

13. The apparatus according to claim 1, wherein said display means changes the displaying style for each of the search images.

* * * * *

UNITED STATES PATENT AND TRADEMARK OFFICE
CERTIFICATE OF CORRECTION

PATENT NO. : 6,038,365
DATED : March 14, 2000
INVENTOR(S): TAKU YAMAGAMI

It is certified that error appears in the above-identified patent and that said Letters Patent is hereby corrected as shown below:

<u>References Cited</u> [56]

U.S. PATENT DOCUMENTS

"Methany et al." should read --Metheny et al.--.

"Assistant Examiner - David R Vincent" should read --Assistant Examiner - David R. Vincent--.

<u>SHEET 1</u>

FIG 1, "confirnation" should read --confirmation--.

UNITED STATES PATENT AND TRADEMARK OFFICE
CERTIFICATE OF CORRECTION

PATENT NO. : 6,038,365
DATED      : March 14, 2000
INVENTOR(S): TAKU YAMAGAMI

It is certified that error appears in the above-identified patent and that said Letters Patent is hereby corrected as shown below:

COLUMN 3

Line 13, "obtains" should read --obtain--.
    Line 34, "cover ter" should read --converter--.

Signed and Sealed this

Third Day of April, 2001

Attest:

NICHOLAS P. GODICI

*Attesting Officer*     *Acting Director of the United States Patent and Trademark Office*